United States Patent
Rist

[11] 3,908,514
[45] Sept. 30, 1975

[54] ASSISTANCE DEVICE FOR A CONTROL ESPECIALLY A CLUTCH CONTROL FOR AUTOMOBILES

[76] Inventor: Michel Théophile Rist, 119 Avenue Morizet, 92 Boulogne, France

[22] Filed: Dec. 18, 1973

[21] Appl. No.: 425,921

Related U.S. Application Data
[63] Continuation of Ser. No. 197,882, Nov. 11, 1971, abandoned.

[30] Foreign Application Priority Data
Nov. 30, 1970 France .............................. 70.40595
Apr. 19, 1971 France .............................. 71.13693

[52] U.S. Cl. ............... 91/391 R; 91/457; 192/191 R
[51] Int. Cl.² ............................................ F15B 13/10
[58] Field of Search .......... 91/391 R, 374, 376, 377, 91/457, 391 A; 192/192 R

[56] References Cited
UNITED STATES PATENTS
2,107,110  2/1938  Eaton et al. ......................... 91/457
2,846,031  8/1958  Kelly ................................ 91/391 R Primary Examiner—Paul E. Maslousky
Attorney, Agent, or Firm—Young & Thompson

[57] ABSTRACT

An assistance device for a control such as a clutch control for heavy automobile vehicles or the like, comprising an assistance pot coupled in parallel with and connected between two points of said control, said assistance pot being provided with two chambers separated from each other by a moving wall, and a piston coupled on the one hand to said moving wall and on the other hand to said control, at a first of said points on this control, one of said chambers being at atmospheric pressure and the other chamber being connected to a source of pressure higher or lower than atmospheric pressure, under the control of a displacement detector responsive to the movement of the second of said points on said control. Said displacement detector may be a modulation valve coupled to the control by a tie-member, said modulation valve comprising a clapper associated with elastic balancing means.

31 Claims, 24 Drawing Figures

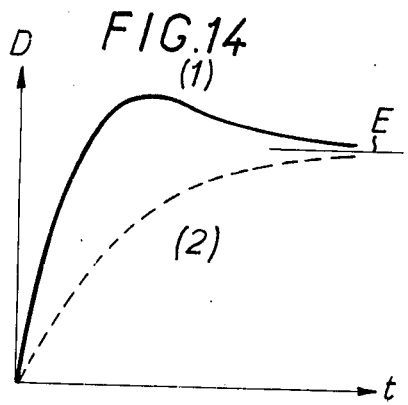
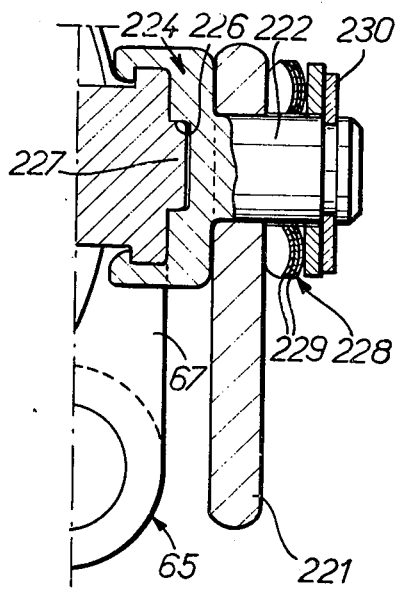
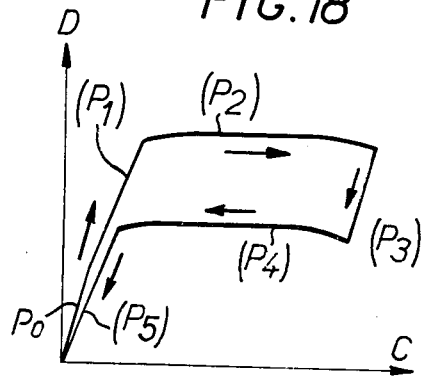
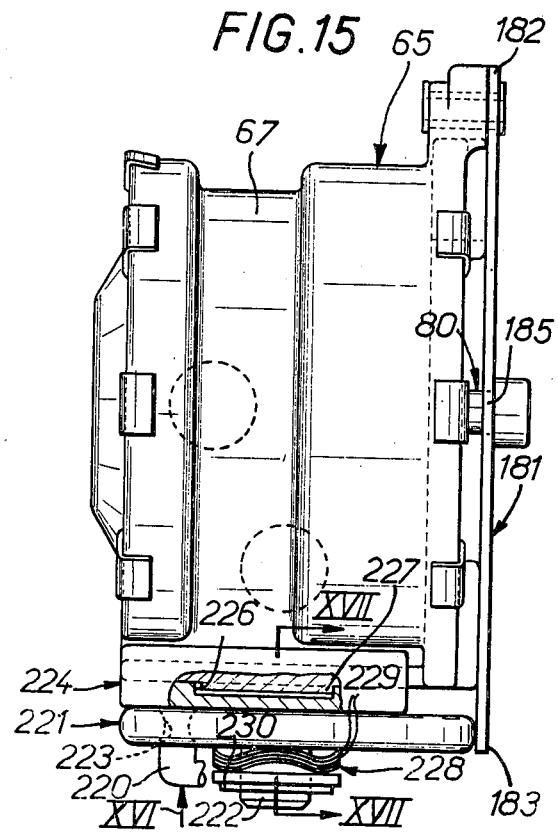
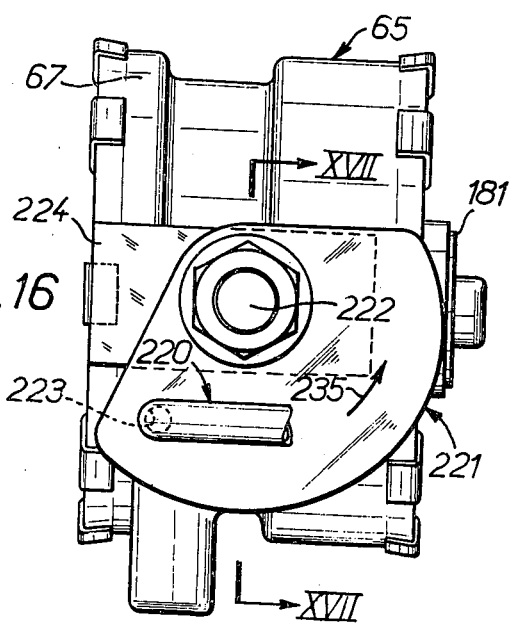

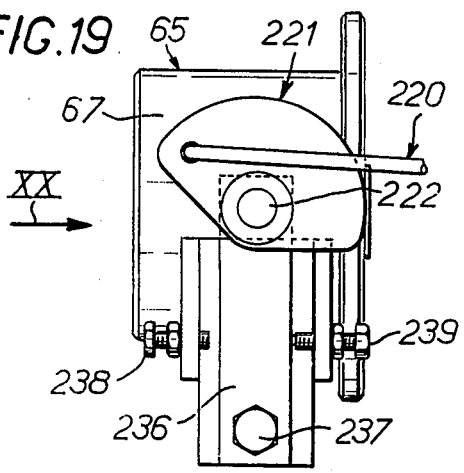
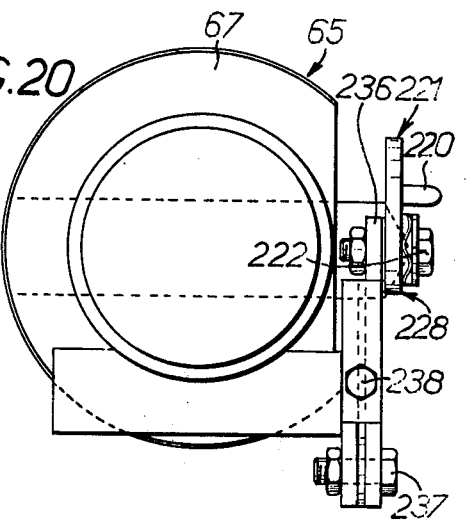
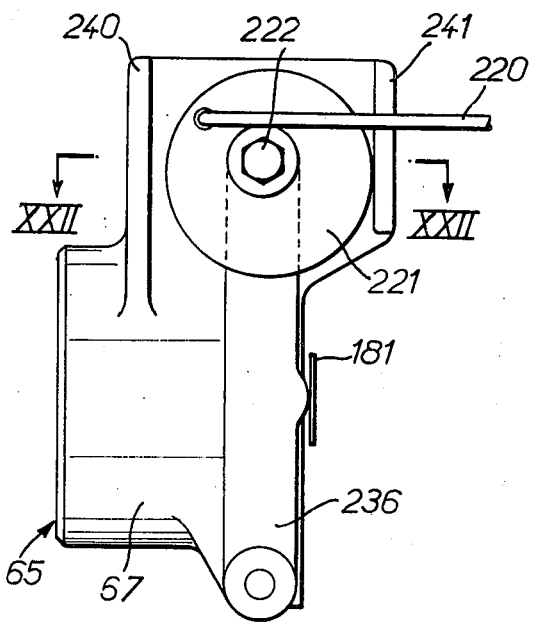
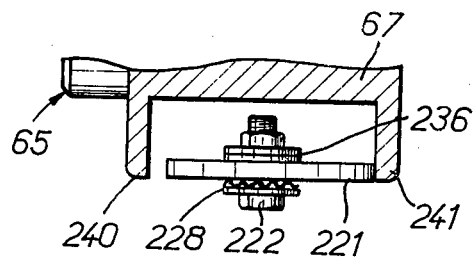

ASSISTANCE DEVICE FOR A CONTROL ESPECIALLY A CLUTCH CONTROL FOR AUTOMOBILES

This is a continuation of application Ser. No. 197,882, filed Nov. 11, 1971 now abandoned.

The present invention relates to an assistance device intended in a general way to be associated with any desired control, and is more particularly directed to the application of this assistance device to the declutching control of an automobile vehicle, especially of a heavy automobile vehicle.

It is already known to associate with the declutching control of an automobile vehicle and assistance device intended to ensure a reduction in the effort which the driver of such a vehicle has to exert on such a control during the actuation of this latter.

The assistance devices known at the present time comprise an assistance chamber acting at a point of the de-clutching control concerned and a clapper-valve controlling the said chamber, and this clapper-valve is inserted in series with the mechanical or hydraulic control rod system which comprises in the usual manner a de-clutching control of this kind between the clutch pedal on which the driver of the vehicle acts and the clutch actuator which directly controls the associated clutch engagement and release means properly so-called.

Such an interposition in series of this clapper-valve has numerous disadvantages.

In the first place, the assistance device in which it is comprised must be provided at the actual moment of assembly of the corresponding de-clutching control, and must form an integral part of this latter. In other words, it is not possible to equip de-clutching controls already existing with such an assistance device without modifying the control rod system.

In addition, the action of the clapper-valve of such an assistance device results in the displacement of a not-negligible volume of fluid, and it is doubtless to such a displacement of fluid that are to be attributed the interruptions of progressiveness and the lack of certainty observed by numerous drivers in the de-clutching control of heavy vehicles equipped with such an assistance device, especially during starting-up on a slope or at full load.

Finally, the clapper-valves and other members utilized in such assistance devices generally have a fairly complicated construction and operation and are for this reason relatively expensive.

The present invention has especially for its object an assistance device which is free from these disadvantages.

According to the invention, an assistance device for a control, such as a clutch control, especially for an automobile vehicle, is characterized in that it comprises, in parallel with respect to the said control, between two points of this control, an assistance pot or cylinder having two chambers separated from each other by a moving wall, and a piston coupled on the one hand to the said moving wall and on the other hand to the said control at a first of the said points of this control, one of the said chambers being at atmospheric pressure and the other chamber being connected to a source of pressure P, higher or lower than atmospheric pressure, under the action of a displacement detector responsive to the movement of the second of the said points of the said control.

An assistance device of this kind being provided so as to be connected in parallel between two points of the control which it is intended to eqip, it advantageously maintains the entirety of the control and in particular does not introduce into the control any uncertainty of operation or interruption of progressiveness.

In addition, due to its being placed in parallel with respect to a control of this kind, the assistance device according to the invention may advantageously be mounted on controls already in existence, even if this control has not initially been designed with a view to the adoption of such an assistance device, and this mounting can be effected at any two points of this control. For example, in the case of a clutch control, this mounting can be effected on the clutch pedal, on the actuator or the associated de-clutching fork, and/or at any point of the rod system coupling the pedal to the said fork.

In addition, in the case of a clutch control, the assistance force provided by the device according to the invention is independent of the effort applied by the driver of the vehicle on the clutch pedal.

This effort is in fact a function of the movement from any one point of the control to another.

In this connection, the assistance device according to the invention lends itself to numerous possibilities of construction, making it possible to obtain, with great versatility, an assistance force which varies in the selected manner with the travel of the clutch pedal, and permitting, if desired, a closer approach to the ideal representative curve of the effort to be applied by the driver of the vehicle on this pedal as a function of its travel, this ideal representative curve being a straight line, as is well known.

Finally, the assistance device according to the invention necessitates only relatively simple members for its application, and is therefore particularly economic for this reason.

Furthermore, it has proved that an assistance device of any kind inevitably introduces a time of response between the moment when an operator acts on the control and the moment when the action of the assistance becomes effective.

When the speed of action of the operator is only moderate, and this is the case for example in a clutch control during starting-up a vehicle, the response time due to the assistance device, which always remains relatively low, has only little importance as compared with this moderate speed of action.

On the other hand, when the operator actuates the control considerable more rapidly, and this is the case for example of a de-clutching effected for changing a gear, the time of response due to the assistance device may become considerable, to the point that any de-phasing between the actions of the control and the assistance is liable to render the assistance ineffective or even detrimental.

The reason for this is in particular that the chamber of the negative pressure regulator utilized in the present invention, which communicates with the assistance pot, carries out simultaneously a double function, namely, on the one hand, the desired function of assistance by putting the source of negative pressure into communication with the assistance pot, and on the other hand, a function of modulation for the establishment of a balance between the travel imposed on the control by the operator and the assistance which is then applied to this control.

When the speed of intervention or action of the operator is moderate, the conditions of operation of the assistance device are always in themselves close to this equilibrium, and in consequence the response time of this assistance device is thus well adapted.

On the other hand, when the speed of intervention or action of the operator is greater, the negative pressure regulator which in practice closes as abruptly as it has been opened under control, gives at its outlet a partial vacuum which, taking account of the downstream position of the assistance chamber with respect to the regulator, and also of the relative volumes of the assistance chamber and of the spaces upstream of this chamber will only reach the said chamber with a certain delay.

In order to overcome this drawback, the present invention proposes an assistance device of the same type as that referred to above, characterized in that the chamber of its depression regulator which communicates with the assistance pot comprises two separate spaces, a first space which is alone connected directly to the assistance pot and which alone is capable of being directly connected to the source of depression, under the control of the associated clapper-valve, and the second space which is in parallel with respect to that preceding, the needle-valve which controls the clapper of this regulator being subjected to the pressure in this second space and not to that of the first, and the said spaces communicating with each other only through passage means which comprise a pressure drop.

Thus, by virtue of this arrangement, the functions of assistance and modulation are carried out in two stages when the operator acts on the control. The assistance device according to the invention first provides an assistance function by putting the source of depression P into direct communication with the assistance pot; it then carries out a function of modulation of this assistance by a delayed return to closure of the clapper-valve of its depression regulator.

This clapper-valve which is thus not abruptly returned to its closed position is permitted to open wide, and the fairly large section of passage thus offered to the depression permits a short response time to be obtained.

In the case of the control of a clutch, this arrangement enables, when the pedal has been abruptly released, the assistance pot to be put directly into communication with the atmosphere, and offers a particular advantage in the case of the control of a clutch in which the return to the engaged position following a de-clutching has a tendency to increase the depression in the assistance pot and therefore to slow-down the process of re-engagement at the risk of causing the clutch to slip.

Again in the case of a form of embodiment in which P is a depression and the displacement detector is a depression regulator, another improvement according to the invention is directed to obtaining a differential assistance, depending on whether it is an action of the assistance device in one direction or an action of this same device in the other direction.

It may in fact prove desirable, for example in the case of a de-clutching control, that the assistance effort supplied by the assistance device associated with this control should be greater during de-clutching than during the engagement after de-clutching.

In fact, as is well known, the force required for the control in de-clutching a clutch is greater than the force developed, for an equal travel, during the return of this clutch to its initial position, so that if the associated assistance effort develops in an identical manner during the course of these two phases of operation, the effort under the foot of the operator is lower or even nil during the re-engagement than during the de-clutching, which is not desirable.

In order to obviate this drawback, and according to another aspect of the present invention, an assistance device of the kind referred to above is characterized in that the needle-valve of its depression regulator is coupled to the control on which it is fitted by a link-rod system comprising in series elastic means and friction coupling means associated with play means having a limited movement.

During the return phase of the control, these play means with limited movement cause a reduction in the assistance.

During the return phase of the control, this assistance is therefore different from that supplied during the outgoing phase of this control, even substantially less, and the invention lends itself advantageously to numerous forms of embodiment permitting a modulation as differentiated as may be desired of these assistance levels to be obtained.

Furthermore, the development of an assistance device according to the invention has led, in an alternative embodiment, to the utilization of an arrangement which has a particular advantage in itself for the control, in both directions, of the moving member of an operator of any kind.

In this respect, the present invention has also for its object a device for the control in both directions of the moving member of an operator of any kind by a lever of any kind, characterized in that it comprises an elastic blade embedded at a first point in a fixed member and coupled at a second point to the moving member of the said operator, and a tie-rod coupled on the one hand to the said lever and on the other hand to the said elastic blade at a third point of this latter arranged on the far side of the second point with respect to the first, and in that an abutment is associated with the elastic blade at a fourth point of the said blade, intermediate between its second point and its third point.

This arrangement provides a particularly simple method of control of the moving member of such an operator.

The objects, characteristic features and advantages of the invention will futhermore be brought out in the description which follows below, given by way of example with reference to the accompanying diagrammatic drawings, in which:

FIG. 14 is a diagram illustrating the results obtained with the alternative form of the device shown in FIG. 13;

FIG. 15 is a plan view of the depression regulator shown in FIG. 13, illustrating a second aspect of this regulator;

FIG. 16 is a view in elevation of this regulator in the direction of the arrow XVI of FIG. 15;

FIG. 17 is a partial view to a larger scale in cross-section of this regulator, taken along the line XVII—XVII of FIG. 15 and FIG. 16;

FIG. 18 is a diagram illustrating the results obtained with the regulator shown in FIGS. 15 to 17;

FIG. 19 is a view similar to FIG. 16 and relates to an alternative form of construction;

FIG. 20 is a side view of this alternative form, taken along the arrow XX of FIG. 8;

FIG. 21 is a view similar to FIG. 16 and illustrates another form of embodiment;

FIG. 22 is a partial view in cross-section of this regulator, taken along the line XXII—XXII of FIG. 21;

FIGS. 1 to 5 illustrate the application of the invention to the de-clutching control of a heavy automobile vehicle having on board a source of pressure P higher than atmospheric pressure (not shown).

Figure 1:
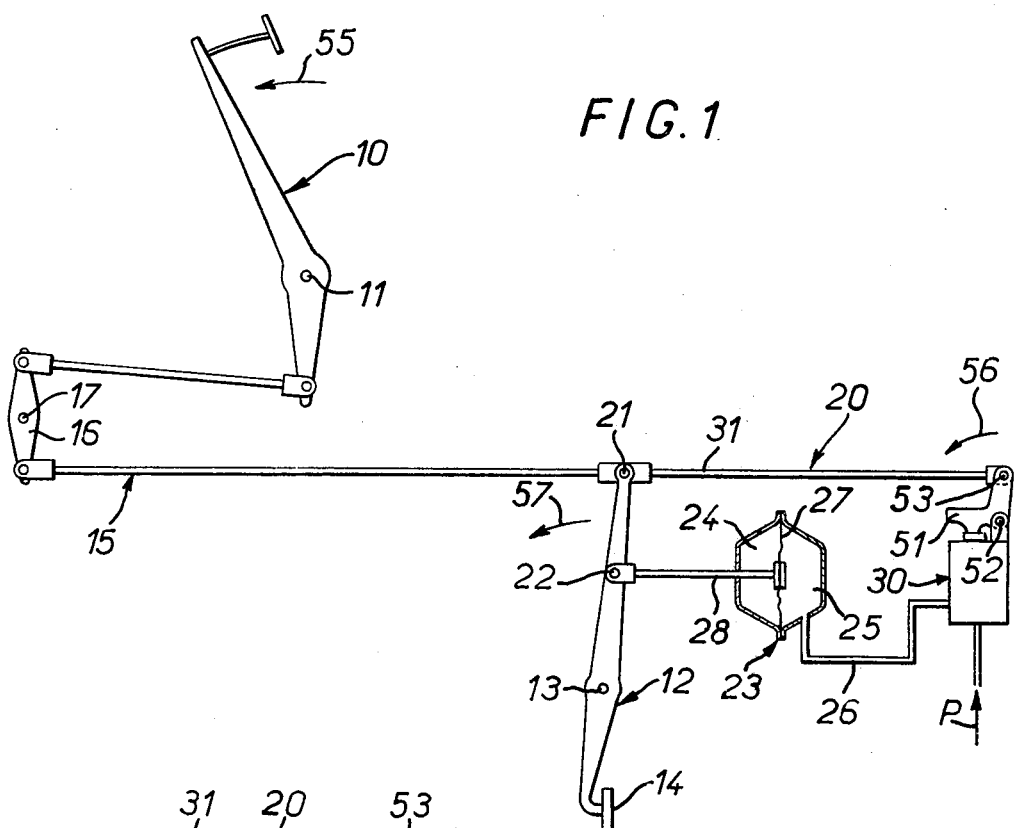
FIG. 1 is a view of a de-clutching control of an automobile vehicle equipped with the assistance device according to the invention.

A control of this kind comprises diagrammatically a clutch pedal 10 pivotally mounted at 11, at the disposal of the driver of the vehicle, and a lever 12 pivotally mounted at 13 and terminating in an actuator 14 intended to act on associated clutch engagement and disengagement means (not shown), the pedal 10 and the lever 12 being coupled to each other in a positive manner by a rod system 15 comprising, in the example shown, a lever 16 pivotally mounted at 17.

The assistance device according to the invention, indicated by the general reference 20 in FIG. 1, is connected in parallel between two points 21, 22 of this control.

In the example shown in FIG. 1, these two points 21, 22 are both carried by the pivoted lever 12 and are aligned with the pivot 13 of this lever.

The assistance device 20 according to the invention comprises an assistance pot 23 and this latter comprises, in a manner known per se, a first chamber 24 at atmospheric pressure and a second chamber 25 which can be connected by a conduit 26 to the source of pressure P, greater in this case than atmospheric pressure. The chambers 24, 25 are separated by a mobile wall which, in the example shown, is a flexible diaphragm 27, and a piston 28 is coupled on the one hand to the said diaphragm 27 and on the other hand to the pivoted lever 12 at the point 22 of this lever.

On the conduit 26 is inserted a displacement detector 30 controlled by a tie-rod 31 in dependance on the displacement of the point 21 of the pivoted lever 12, this tie 31 may be for example a flexible cable or a rigid rod as shown.

Figure 2:
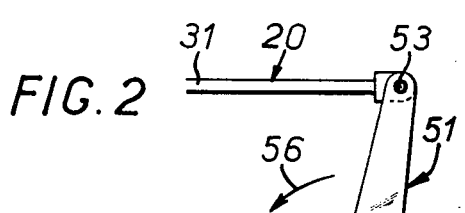
FIG. 2 is a view in axial cross-section of one of the members utilized in such an assistance device.

In the example of application considered, the device 20, shown separately in FIG. 2, is a modulation valve of a type known per se. This modulation valve comprises a body 32 in which are formed two chambers 33, 34, capable of communicating with each other under the control of a clapper-valve 35 urged in the direction of a shoulder 36 of the body 32 by elastic return means 37.

The chamber 33 communicates by a nozzle 38 with the source of pressure P. The chamber 34 is separated into two compartments 34A, 34B by a piston 39, the compartment 34A communicating with the atmosphere through a nozzle 40A, and the compartment 34B communicating with the assistance pot 23 through a nozzle 40B. The conduit 26 referred to above is connected to the nozzle 40B.

The piston 39 is formed with an axial passage 42 and in the axis of this latter is extended by a tubular needle-valve 43 which passes with a clearance through a passage 44 formed in the body 30, in the axis of the internal shoulder 36 of this latter.

The piston 39 is acted on by elastic restoring means 46; elastic balancing means are also associated with it, these being formed, in the example shown, by a spring 47 which is wholly contained in the body 32 of the modulation valve concerned, between the piston 39 of this valve and a supporting cup 48, this latter being extended by an axial finger 49 which projects out of the said body 32 through an axial passage 50 formed in the said body.

On this axial finger 49 acts one of the arms of an elbowed lever 51 which is pivoted at 52 on the body 32 of the valve, and the other arm of which is coupled at 53 to the tie-rod 31 of the assistance device 20 according to the invention.

The operation of a device of this kind is as follows. At rest, in the position shown, the tubular needle-valve 43 is at a distance from the clapper-valve 35, and this latter is held by its elastic return means 37 against the shoulder 36 of the body 32 of the modulation valve 30. There is no communication between the chambers 33 and 34 of this valve; the chamber 34 is therefore entirely at atmospheric pressure and this is also true for the assistance pot 33.

It will now be assumed that a de-clutching force is applied on the pedal 10 in the direction of the arrow 55 of FIG. 1. This force results in a pivotal movement of the elbowed lever 51 in the direction of the arrow 56 of FIGS. 1 and 2. There is in consequence a movement of the cup 48 into the body 32 of the modulating valve 30 and, the spring 47 interposed between this cup and the piston 39 of this valve being assumed to be sufficiently stiff, the piston is moved downwards in the direction of the clapper-valve 35.

As soon as the tubular needle-valve 43 carried by the piston 39 comes into contact with the clapper-valve 35, it forces this latter to move away from the associated shoulder 36, which puts the chamber 33 of the modulation valve 30 into communication with the compartment 34B of the chamber 34 of this valve. This allows the pressure P to penetrate into this compartment 34B and from thence to reach the chamber 25 of the assistance pot 23, in which it acts on the flexible diaphragm 27 to push back the piston 28, and applies, through the intermediary of this latter, an action on the pivoted lever 12 in the direction of the arrow 57 of FIG. 1, that is to say in the direction corresponding to the downward movement of the pedal 10.

It is from this action that the assistance is ensured by the device according to the invention on the control of the engagement and release of the clutch means concerned.

However, simultaneously, and to the extent that the depression force applied on the pedal 10 is maintained at a definite level, the pressure P pushes back the piston 39 against elastic balancing means constituted by the spring 47. The clapper-valve 35, urged by its elastic return means 37, follows the tubular needle-valve 43 in its return movement until it again comes into contact with the associated shoulder 36, which interrupts all communication between the two chambers 33, 34 of the modulation valve 30. Any communication between the compartments 34A, 34B of the chamber 34 of this valve is furthermore impossible during the whole of this movement, since in this movement the clapper-valve 35 is applied against the extremity of the tubular needle-valve 43.

On the other hand, if the depression force applied on the pedal 10 is increased, there is a fresh opening of the clapper-valve 35 and the process of assistance is developed correspondingly, as described above, until a new equilibrium is obtained for which the clapper-valve 35 is in contact with the shoulder 36 of the body 32 of the valve and for which the tubular needle-valve 43 is in contact with the clapper-valve 35. A definite pressure intermediate between atmospheric pressure and the pressure P is developed each time in the compartment 34B of the chamber 34 of the modulation valve 30, and also in the chamber 25 of the assistance pot 23, this definite pressure being dependent on the displacement of the point 21 of the pivoted lever 12 through the intermediary of the spring 47.

The simplicity of construction of the modulation valve and of all the members of the assistance device according to the invention will be noted; this device may advantageously be fitted on any pre-existing control.

Figure 3:
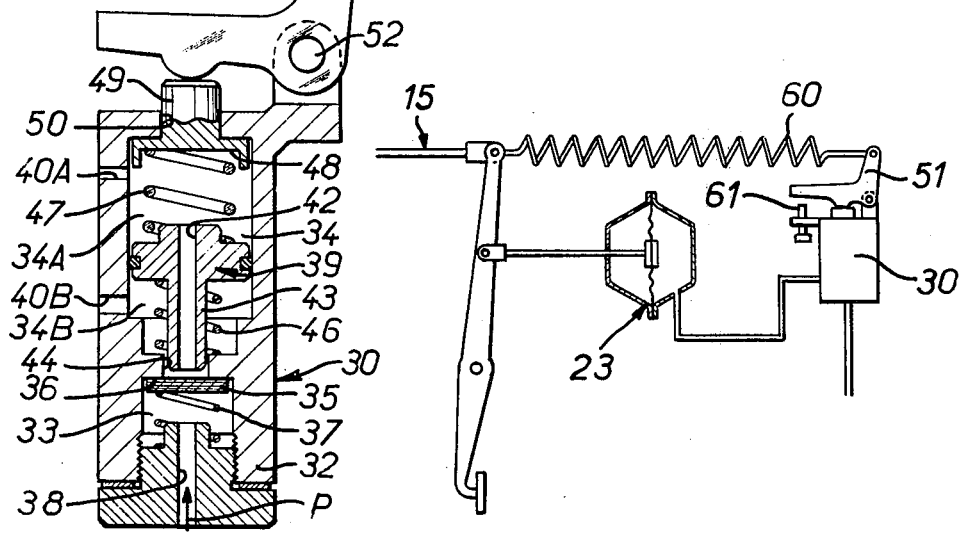
FIG. 3 is a partial view similar to FIG. 1, and relates to an alternative form of embodiment.

According to the alternate form of construction shown in FIG. 3, the tie-rod coupling the rod system 15 to the elbowed lever 51 which controls the modulation valve 30 is a spring 60, and with said lever 51 there is associated an abutment member 61.

The strength of this spring is chosen to be adequate in order that, during a first period, this spring behaves like a tie-rod without elongation.

In a second period of time, after the lever 51 has come into contact with the abutment 61, the assistance effort due to the pot 23 remains constant irrespective of the subsequent depression of the de-clutching pedal. The tractive effort due to the spring 60 acting in opposition to the assistance effort provided by the pot 23, as described above, the total assistance effort decreases from the moment of contact of the lever 51 with the abutment 61, which gives the best adaptation of this assistance effort to the seach for the ideal curve for the corresponding effort under the foot.

Figure 4:
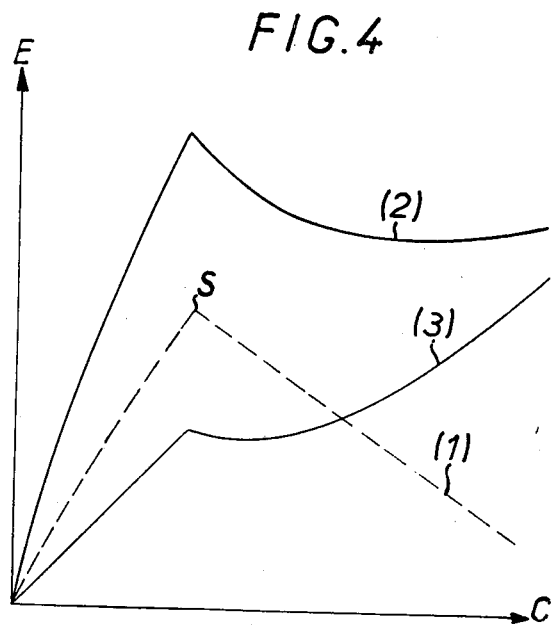
FIG. 4 is a diagram illustrating the operation of this alternative.

The result is illustrated by the diagram of FIG. 4, on which there is plotted in abscissae the travel C of any point on the de-clutching control, for example the de-clutching pedal, and in ordinates the corresponding force E.

The curve (1) represents the assistance effort provided by the device shown in FIG. 3. After contact of the lever 51 with the abutment 61 (point S of the curve), the assistance effort decreases.

The curve (2) represents the effort of a diaphragm clutch; this shows a well known saddle-back characteristic.

By virtue of the maximum point S shown by the curve (1), the curve 3 representing the effort which the driver of the vehicle has to apply on the clutch pedal, obtained by subtraction of the two preceding curves (1), (2), does not show a saddle-back characteristic as pronounced as that of the curve (1).

It will be understood that in this case the spring 60 forms part of the balancing elastic means associated with the clapper of the modulation valve 30, and the characteristics of this latter must be determined in consequence.

In this connection, and according to an alternative form (not shown), the spring 47 may be eliminated, the piston 39 being formed integral with the associated axial finger 49, and the elastic balancing means of this piston 39 being then fully ensured by a spring arranged in the same way as the spring 60 referred to above.

It should be stated in this connection that the spring 46 is a simple return spring and that in practice it has no action in the balancing of the piston 39.

Figure 5:
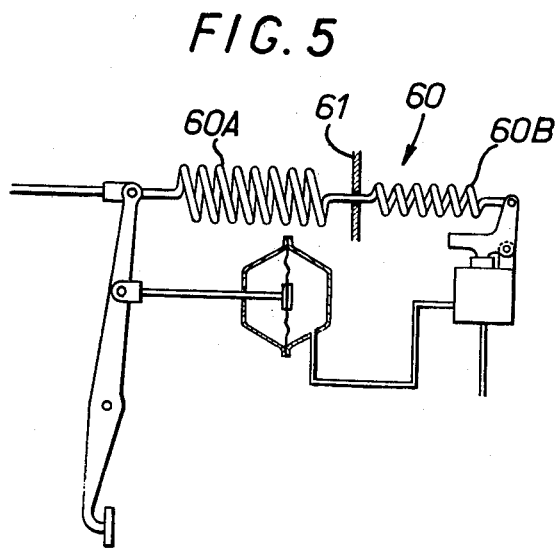
FIG. 5 is a partial view similar to FIG. 1 and relates to another alternative form of embodiment.

According to the alternative form shown in FIG. 5, the spring 60 is formed of two elements 60A, 60B in series, and an end-of-travel stop 61 is associated with the element 60B. As soon as the element 60B is in contact with this stop, the element 60A remains alone in action.

It has been assumed above that the vehicle concerned had available a source of pressure P greater than atmospheric pressure, a source of compressed air for example.

Figure 6:
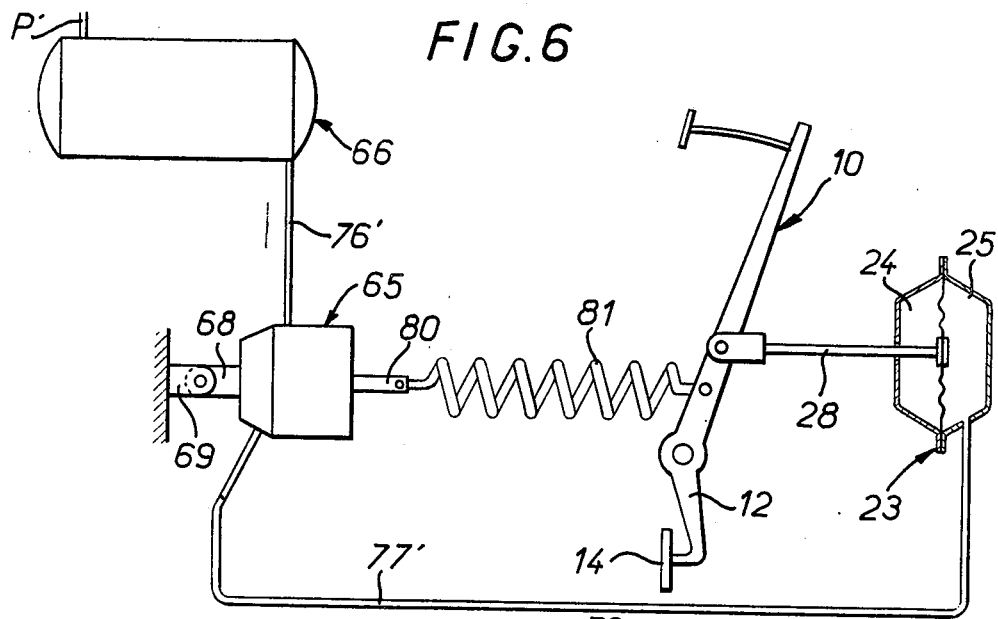
FIGS. 6 and 7 are respectively similar to FIG. 1 and 2, and illustrate another de-clutching control equipped with an assistance device in accordance with the invention.

The alternative forms of construction shown in FIG. 6 and following concern the case in which the vehicle is not provided with such a source of pressure, and in which the assistance is obtained by means of a source of negative pressure P′, taken for example from the level of the carburettor of such a vehicle; this is the most frequent case with passenger vehicles.

In the example shown in FIG. 6, the clutch pedal 10 is integral with the pivoted lever 12 which carries the de-clutching stop 14, and the assistance pot 23 is coupled by its piston 28 to the pedal 10.

As previously, the chamber 24 of the assistance pot 23 is at atmospheric pressure while its chamber 25 is connected to the source of depression P′ through the intermediary of a vacuum regulator 65 and a buffer tank 66.

Figure 7:
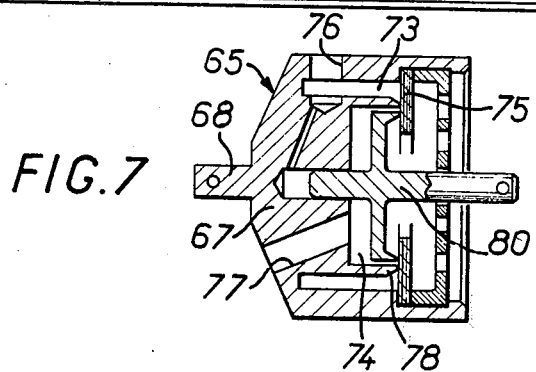

The depression regulator 65, known in itself and shown separately in FIG. 7, comprises a body 67 coupled by an axial extension 68 to a fixed point 69 of the vehicle (see FIG. 6). In this body are formed two coaxial cylindrical chambers 73 and 74, which communicate with each other under the control of a clapper-valve 75. The chamber 73 is connected to the buffer tank 66 by a nozzle 76 and a conduit 76', and the chamber 74 is coupled to the chamber 25 of the assistance pot 23 by a nozzle 77 and a conduit 77'. The clapper 75 which is normally applied against a clapper seating 78 is subjected to the action of a cylindrical needle-valve 80 coupled by a spring 81 to the pedal 10 (see FIG. 6).

When a depression force is applied on this pedal 10, the needle-valve 80 forces the clapper 75 to move away from its seating 78, which puts the chamber 73, 74 of the depression regulator into communication and which thus ensures the introduction of a depression into the chamber 25 of the assistance pot 23. The chamber 24 of this pot being at atmospheric pressure, the piston 28 applies on the pedal 10 a tractive force which ensures the desired assistance effort.

As in the previous case, a state of equilibrium is established for which the clapper 75 is applied against its seating 78, the needle-valve 80 is in contact with this clapper 75, and the chamber 74 of the regulator 65 together with the chamber 25 of the depression pot 23 are the seat of the depression having a level determined by the corresponding downward movement of the pedal 10.

Figure 8:
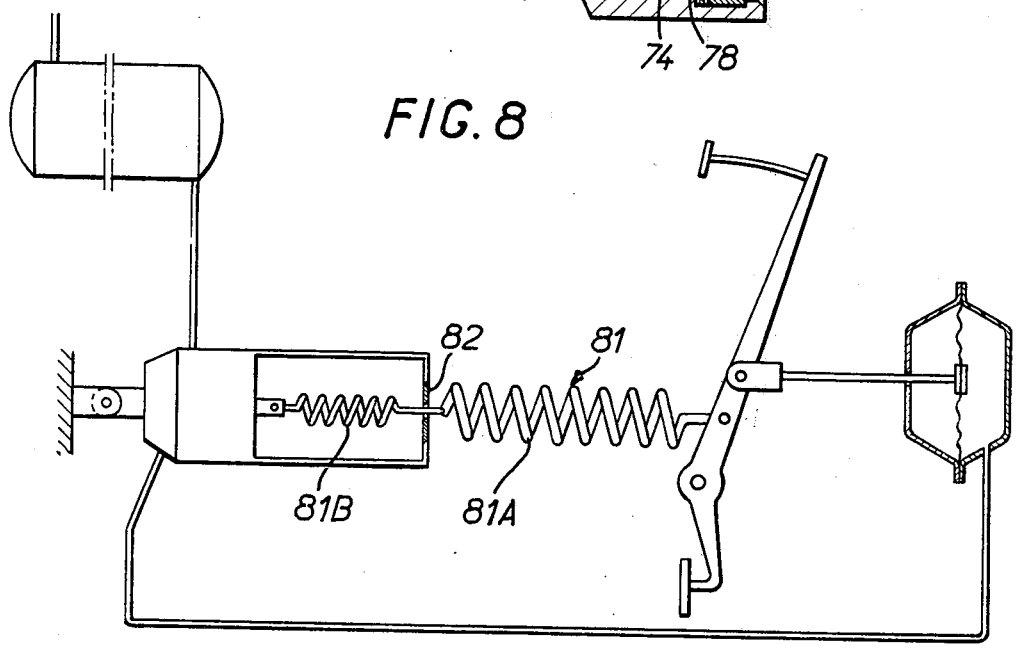
FIG. 8 is similar to FIG. 6 and is concerned with an alternative form of construction.

According to the alternative form shown in FIG. 8, the spring 81 is closed, in a manner similar to the form of embodiment shown in FIG. 5, by two elements in series 81A, 81B, an end-of-travel stop 82 being associated with the element 81B.

Figure 9:
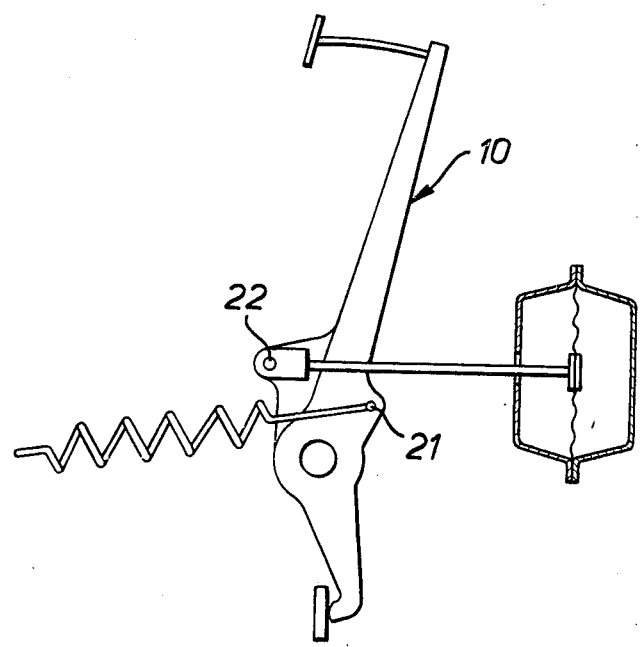
FIGS. 9 and 10 are two partial views similar to FIGS. 6 and 8, and are each respectively concerned with another alternative form of embodiment.
Figure 10:
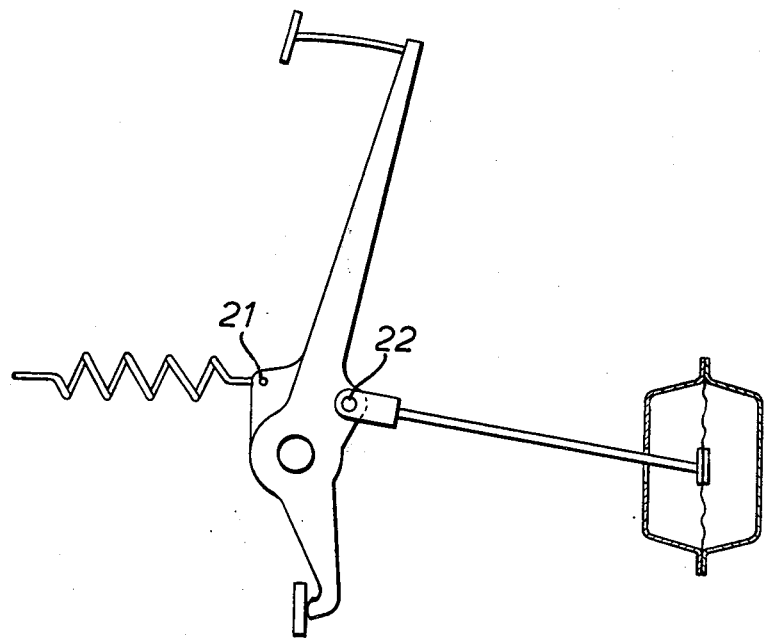

According to the alternative forms shown in FIGS. 9 and 10, the two points 21, 22 of the control, between which the assistance device according to the invention is connected in parallel, are displaced laterally with respect to the pivoted element on which they are carried, this pivoted element in the example shown being the clutch pedal 10. This displacement may affect one or the other of these points, or both simultaneously as shown, and in this case the displacement may be effected in a crossed manner (see FIG. 9) or uncrossed (see FIG. 10).

However, this may be, such a judiciously arranged displacement makes it possible to obtain a variation of the resistive force at 21 or/and of the assistance effort at 22, not proportional to the travel of the pedal, that is to say to modify at will in one direction or another the curve representing the assistance effort obtained by means of the device according to the invention.

Figure 11:
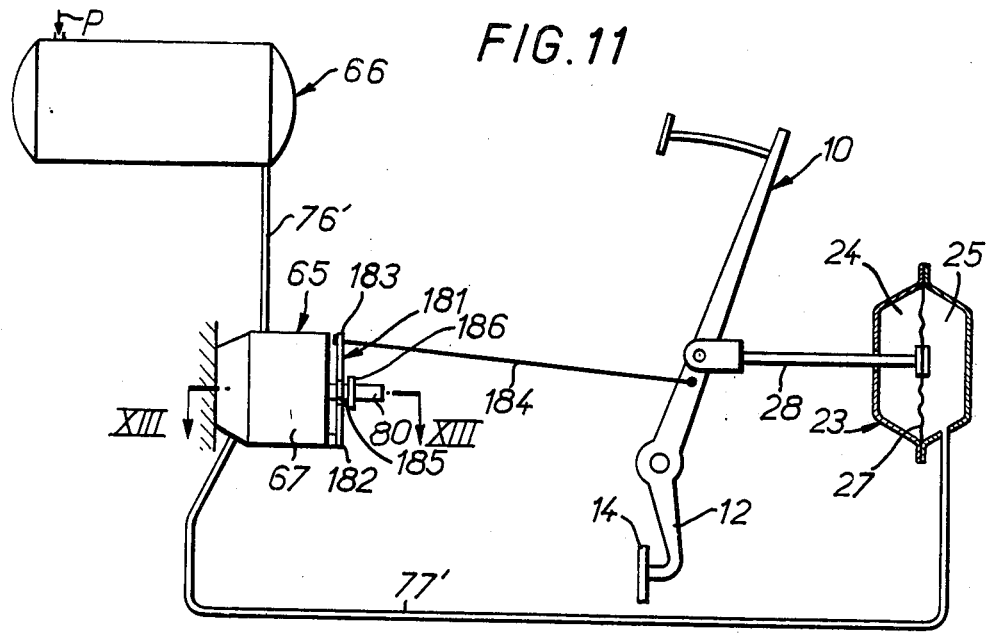
FIG. 11 is a view similar to FIG. 6 and relates to a further alternative form of the assistance device according to the invention.

According to the alternative form illustrated in FIG. 11, the spring 81 described with reference to FIG. 6 is replaced by or associated with an elastic blade. The needle-valve 80 of the depression regulator 65 is coupled to the clutch pedal 10 by an elastic blade 181 fixed at its extremity 182, coupled to the pedal 10 by its other extremity 183 through the intermediary of a tie-rod 184 of any kind, and engaged on the needle-valve 80 at a point 185 intermediate between the extremities 182, 183, the needle-valve 80 carrying a driving flange 186 facing this point 185.

Figure 12:
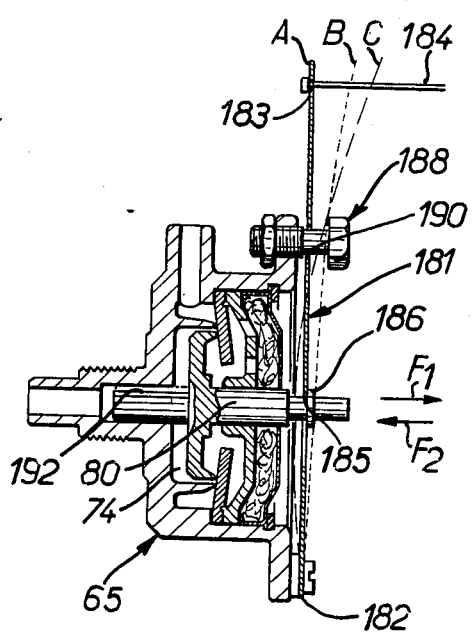
FIG. 12 is a view in axial section of the depression regulator utilized in this alternative, looking along the plane of FIG. 11.

This arrangement makes it possible to develop a further alternative shown in FIG. 12, in which the force of this blade 181 on the displacement of the needle-valve 80 becomes reversed beyond a pre-determined travel of the pedal 10. According to this alternative, with this blade 181 a stop 188 is associated at a point 190 intermediate between the point 183 at which it is coupled to the tie-rod 184 and the point 185 at which it is coupled to the needle-valve 80.

When the tie-rod 184 applies a pull on this blade 181, during a first period this blade passes from its position A shown in full lines, to its position B, shown in broken lines, for which it is in contact with the stop 188; this corresponds to the displacement of the needle-valve 80 in the direction of the arrow F1 of FIG. 12 thereby enabling flow through groove 192 to initiate power assistance. In a second period and if the pull applied by the tie-rod 184 is continued, the blade 181 becomes deformed until it takes for example the position C shown in chain-dotted lines in FIG. 12. In this position the groove 192 in needle-valve 80 is effectively closed by the corresponding casing. This corresponds to the displacement of the needle-valve 80 in the direction of the arrow F2 of FIG. 18, opposite to that of the arrow F1.

It will further be noted that in this alternative form, the communication of the chamber 74 of the vacuum regulator 65 with the associated assistance pot (not shown) is effected by the groove 192 formed longitudinally on the needle-valve 80 in this chamber.

As has been emphasized above, this elastic blade arrangement has a particular advantage in itself for the control in both directions, by a lever, of the moving member of an operator of any kind; in the particular example described, this moving member is the needle-valve of the depression regulator.

Figure 13:
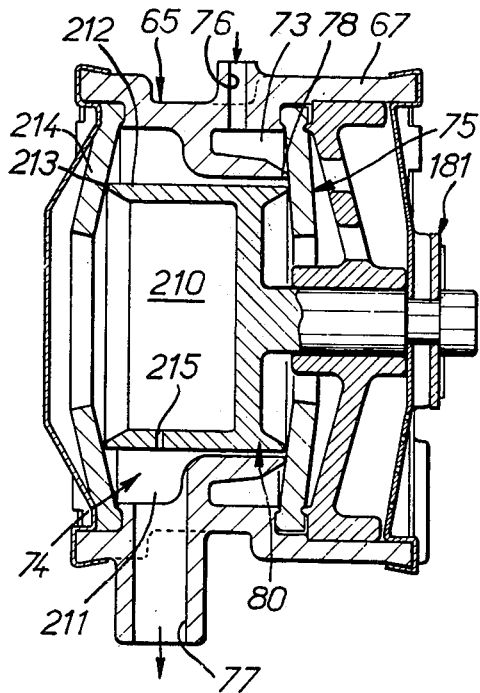
FIG. 13 is a view similar to FIG. 12 and relates to an alternative form of construction of this depression regulator, the cross-section of this regulator being taken along the line XIII—XIII of FIG. 11.

According to the alternative form of embodiment shown in FIG. 13, the depression regulator 65 comprises a body 67 in which are formed two coaxial cylindrical chambers 73, 74 which communicate peripherally between each other under the control of a clapper 75. The clapper 75, which is normally applied against a clapper seating 78, is subjected to the action of a needle-valve 80 coupled by a spring blade 181 and a tie-rod 184 to the pedal 10 (see FIG. 11). This spring blade is fixed at one extremity 182, coupled to the tie-rod 184 at its other extremity 183 and engaged at an intermediate zone 185 on the needle-valve 80. In an alternative form (not shown) the blade 181 is simply supported at 182 on the body of the regulator.

The chamber 73 of the regulator 65 is connected to the buffer tank 66 by a nozzle 76 and a conduit 76'.

According to the invention, and in conformity with the form of embodiment shown in FIG. 13, the chamber 74 of the regulator 65 is divided into two separate compartments 210, 211 by a skirt 212 which is carried by the needle-valve 80 on that of its faces opposite to the face which bears against the clapper 75, and the edge 213 of which bears annularly against an elastically deformable closure diaphragm 214. The compartment 210 is formed inside the skirt 212 and the compartment 211 is outside this skirt.

The compartment 211 is the only one to communicate with the chamber 25 of the assistance pot 23 by a nozzle 77 and a conduit 77'.

The compartment 210 is in a way shunted on the compartment 211 and communicates with the compartment 211 only by pressure loss passage means.

In the example shown, this is a throttle nozzle 215 formed in the skirt 212; as an alternative, slots may be formed on the edge 213 of this skirt or channels may be arranged in the diaphragm 214.

When a downward force is applied on the pedal 10, the needle-valve 80, pulled by the elastic blade 181, forces the clapper 75 to move away from its seating 78, which puts the chamber 73 of the regulator into communication with the compartment 211 of the chamber 74 of this regulator, and which therefore immediately ensures the introduction of a depression into the chamber 25 of the assistance pot 23, successively through the chamber 73 of the regulator, the compartment 211 of this latter, the nozzle 77 and the conduit 77'. As the chamber 24 of the pot 23 is at atmospheric pressure, the tie-rod 28 of this latter applies on the pedal 10 a tractive force which ensures the desired assistance effort. The partial vacuum which fills into the compartment 210 of the chamber 74 of the regulator, through the nozzle 215, the needle-valve 80 is gradually returned in the direction of its initial position. there is thus gradually established a state of equilibrium in which, taking account of the elasticity of the blade 181, the clapper 75 is again applied against its seating 78, the needle-valve 80 is in contact with this clapper 75, and the assembly of the chamber 74 of the regulator 65 and the chamber 25 of the negative pressure pot 23 are the seating of a negative pressure having a level determined by the corresponding downward movement of the pedal 10.

This result is illustrated in the diagram of FIG. 14, on which there are plotted in ordinates the depression D in the assistance pot 23 and in abscissae the time $t$.

The curve (1) in full lines illustrates the negative pressure controlled by the regulator according to the invention. It is asymptotic by decreasing values to a state of equilibrium E. The curve in broken lines (2) illustrates the results obtained with the regulator described in the first embodiment; it is asymptotic by increasing values to the state of equilibrium E.

Thus the assistance effort supplied by the device according to the invention passes through a maximum before tending towards the equilibrium E; in other words, it is more intense and more rapidly obtained than with the embodiment described in the main patent.

In order to modify the progression of this assistance effort, it is possible to modify in consequence the section of passage of the throttle nozzle 215, and/or to modify the size of the compartment 210 located to the rear of the needle-valve 80.

FIGS. 15 to 24 illustrate a second aspect of the invention, in which the needle-valve 80 of the regulator 65 is coupled to the pedal 10 or more generally to any point on the control concerned, by a rod system comprising in series elastic means and friction coupling means associated with play means having a limited movement.

According to the form of embodiment shown in FIGS. 15 to 18, this system comprises a rod 220 connected on the one hand to the control and on the other hand to a cam 221 rotatably mounted on a shaft 222 carried by the regulator 65. It is against the edge of this cam 221 that the free extremity 183 of the elastic blade 181 bears which pulls on the needle-valve 80 of the regulator 65.

The rod 220 is coupled at the point 223 of the cam 221, eccentric with respect to the shaft 222 of the cam. This shaft is fixed to a slide 224 mounted to move freely on the body 67 of the regulator 65 between two abutments forming the associated play means. For example, as shown, the slide 224 which is of C-section engaged on a corresponding profile of the body 67 of the regulator, has an elongated opening 226 in which is engaged a boss 227 of smaller length carried as a projection on the said body 67. Finally, a friction coupling 228 is interposed between the cam 221 and the slide 224 which carries it. For example, as shown, elastically deformable corrugated washers 229 are engaged on the shaft 222 of the cam and are kept clamped by a circlips 230 applying this cam 221 against the slide 224.

During a downward movement of the pedal 10, a tractive force is applied on the cam 221 by the rod 220 and the cam is displaced first of all without rotation towards the right-hand side of FIGS. 15 and 16 until the play J provided between the slide 224 and the body 67 of the regulator 65 is absorbed.

This tractive pull then causes rotation of the cam 221 in the direction of the arrow 235 of FIG. 16. The contour of the cam 221 is such that, during the course of its rotation, the cam progressively moves the elastic blade 181 away from the regulator 65. This elastic blade thus applies a tractive pull on the needle-valve of this regulator, and as previously described, this results in the introducing of a negative pressure D in the assistance pot.

The operation of this arrangement will be better understood by referring to the diagram of FIG. 18, on which the negative pressure D in the assistance pot has been plotted in ordinates, and the travel C of the point of the control to which the rod 220 is coupled, as abscissae.

The contour of the cam 221 is established in such manner that the representative curve of this negative pressure D has first of all a rising curve $P_1$ following the straight line $P_0$ representing the initial displacement of the cam corresponding to the play J, and then an almost horizontal line $P_2$, preferably slightly incurved, especially at its extremity.

If the action on the control is released, the rod 220 pushes back the cam 221; the latter first returns linearly to its initial position, without rotation, by absorption of the play formed between the slide 224 which carries the cam and the body 67 of the regulator 65. This linear movement results in a straight line section $P_3$ of the curve representing the partial vacuum D, parallel to the initial section $P_1$.

The cam 221 then turns in the direction opposite to that of the arrow 235, and the elastic blade 181 then progressively releases the tractive pull which it applies on the needle-valve 80 of the regulator 65. The curve representing the partial vacuum D in the assistance pot 23 then follows a section $P_4$ parallel to the section $P_2$ and then a section $P_5$ parallel to the section $P_1$ until it returns to the origin.

Thus, for equal travel, the partial vacuum D has during the course of the return stage $P_4$, a value less than its value during the course of the outward stage $P_2$.

In order to modify the progression of this partial vacuum, it is only necessary to modify the contour of the cam 221, and/or the inportance of the associated play means. According to the alternative form of construction shown in FIGS. 19 and 20, the support of the shaft 222 of the cam 221 is a lever 236 pivotally mounted at 237 on the body 67 of the regulator between two abutments or stops 238, 239, preferably adjustable, which form the associated play means. As previously, a friction coupling 228 is provided between the cam 221 and the lever 236, round the shaft 222 of this cam. The operation of this alternative is similar to that previously described.

FIGS. 21 and 22 relate to an alternative form of construction in which the cam 221 is carried as previously by a pivoted lever 236, but on the other hand the elastic blade 181 bears against this lever and on the other hand the associated play means with limited movement are constituted by two abutments 240, 241 carried by the body 67 of the regulator 65 on each side of the cam 221, and this latter is adapted to co-operate directly with these abutments.

The operation of this alternative form is identical with that previously described but there may be provided on the cam 221 two separate tracks, one intended to co-operate with the abutment 240 and the other with the abutment 241, which gives the curve representing the operation a shape during the return stage which is different from its shape on the outward stage.

Figure 23:
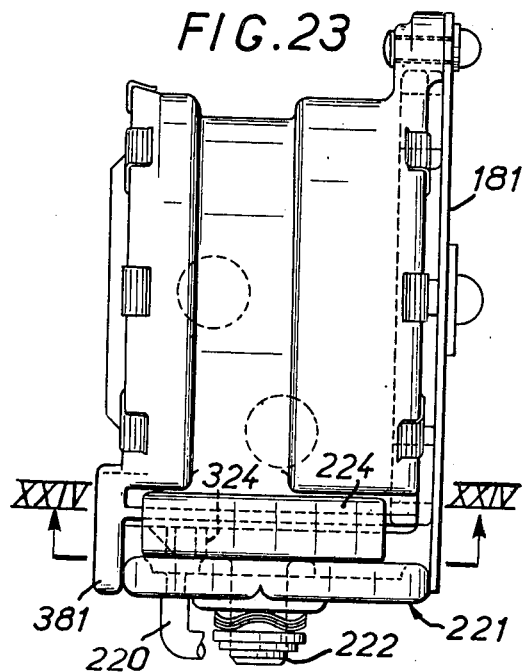
FIG. 23 is a view similar to FIG. 15 and is concerned with another alternative form.
Figure 24:
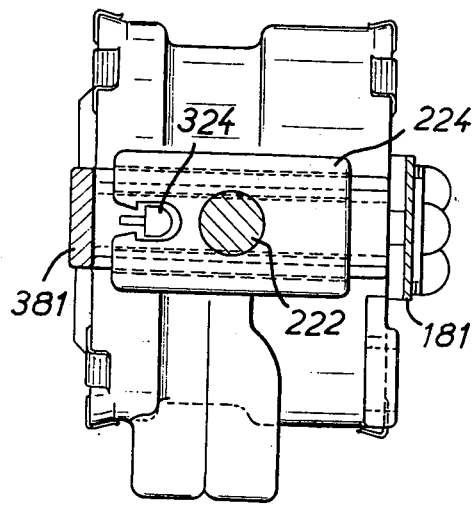
FIG. 24 is a view in cross-section of this latter alternative, taken along the line XXIV—XXIV of FIG. 12.

According to the alternative form shown in FIGS. 23 and 24, the shaft 222 of the cam 220 is carried by a slide 224, the movement of which is limited by an abutment 324 forming a projection on the body of the regulator. The cam 221 is intended to co-operate on the one hand with the elastic blade 181 and on the other hand with a fixed abutment 381 carried by the body of the regulator at a position diametrically opposite to that of the elastic blade 181.

During the outward stage there is a displacement of the slide 224 followed by rotation of the cam in contact with the single elastic blade 181.

On the return stage, there is a displacement of the slide 224, and then simultaneous co-operation of the cam with the abutment 381 and the elastic blade 181, the profile of the cam being arranged in consequence and thus making it possible to differentiate at will the outward and return stages.

It will of course be understood that the present invention is not limited to the forms of embodiment described above, but includes any alternative form of execution and/or of combination of its various parts.

In addition, the field of application of the invention is not limited to that of clutch controls, but extends to any other type of control whatever.

What I claim is:

1. Actuating mechanism comprising linkage means including a control lever mounted for rotation about a fixed pivot in response to force exerted by an operator, and operating means arranged at one end of said control lever spaced from said fixed pivot, said linkage means being free of lost motion between a point of force application by the operator and said operating means and immediately, directly and positively transmitting force exerted by the vehicle's operator to said operating means from the beginning of the rotation of the control lever, assistance means arranged along the linkage means and bearing directly on said control lever between the point of force application by the operator and said operating means, said assistance means including a power cylinder having two chambers, a movable wall separating said chambers, a piston connected to the movable wall and to a first point along the lever spaced from said fixed point, one of the chambers being at atmospheric pressure, the other chamber being connected to a source of pressure other than atmospheric, said assistance means further including sensing means responsive to the movement of a second point on said linkage means spaced from said fixed pivot for controlling said other chamber, whereby upon force being exerted on the control lever by an operator the power assistance produced by the power cylinder acts in parallel to the direct and positive transmission of said force from the control lever to the operating means.

2. Actuating mechanism as claimed in claim 1, in which said operating means comprises a foot pedal on said one end of said control lever.

3. Actuating device comprising an exclusively mechanical linkage means, a force applying member provided at one end of said linkage means, said linkage means including a control lever mounted for rotation about a fixed pivot, an operating member arranged at one end of said control lever spaced from said fixed pivot and remote from said force applying member, said linkage means being free of lost motion between the force applying member and the operating member for immediately, directly and positively transmitting force applied by said force applying member to said operating member, from the outset of force application; and assistance means generally spaced from said linkage means but connected at two points therealong intermediate said operating member and said force applying member and remote from said fixed pivot, said assistance means defining an assistance loop between said points, said assistance means including a power cylinder having two chambers, a movable wall separating said chambers, a piston connected to the movable wall and having a first elongated connecting member secured to a first of said points along said linkage means and extending away therefrom, one of the chambers being at atmospheric pressure, the other chamber being connected to a source of pressure other than atmospheric, said assistance means further comprising a second elongated mechanical connecting member secured at the second point to said linkage means and extending away therefrom and responsive to movements of the second point, said second elongated connecting member being operatively connected to a valve means, for regulating the communication of the source of pressure with said other chamber, so that when force is applied to said force applying member said assistance means acts in parallel to the force transmitted directly by said linkage means.

4. An assistance device as claimed in claim 3, in which said valve means is a modulation valve and is coupled to said control lever by said second member, said modulation valve having a clapper valve member and resilient balancing means associated therewith.

5. An assistance device as claimed in claim 4, in which said resilient balancing means are wholly contained in said modulation valve.

6. An assistance device as claimed in claim 4, in which said resilient balancing means are at least in part incorporated in said second member.

7. An assistance device as claimed in claim 6, in which said second member has a tension spring and acts on said modulation valve via a lever associated with an end-of-travel abutment.

8. An assistance device as claimed in claim 7, in which said tension spring comprises at least two serially connected elements, an end-of-travel abutment being associated with one of said elements.

9. An assistance device as claimed in claim 4, in which said modulation valve has two chambers separated by a clapper valve member, one chamber communicating with said source of pressure P, the other chamber with said power cylinder, and said valve member is operated by a tubular needle-valve, the second member acting on said needle member.

10. An assistance device as claimed in claim 3, in which said source of pressure is a source of compressed air.

11. An assistance device as claimed in claim 3, in which said source of pressure is a source of negative pressure and said valve means is a negative pressure regulator.

12. An assistance device as claimed in claim 11, in which said negative pressure regulator comprises two chambers separated by a non-return valve member, one of said chambers communicating with said source of negative pressure and the other communicating with the power cylinder, said non-return valve member being actuated by a needle-valve coupled to said control lever at said second point.

13. An assistance device as claimed in claim 12, in which said needle valve is coupled to said control lever by means including a spring.

14. An assistance device as claimed in claim 13, in which said last-mentioned spring comprises at least two serially connected elements, an end-of-travel abutment being associated with one of said elements.

15. An assistance device as claimed in claim 13, in which said spring is formed as a resilient blade fixed at one end and connected via a tie-member to said second point and to the needle-valve of said negative pressure regulator at a point spaced from said one end.

16. An assistance device as claimed in claim 15, in which an abutment is associated with said resilient blade at a point intermediate the point at which said blade is coupled to the tie-member and the point at which said blade is connected to the needle-valve of said negative pressure regulator.

17. An assistance device as claimed in claim 3, in which said source of pressure is a source of negative pressure, said valve means being a pressure regulator comprising two chambers separated by a valve member, one chamber communicating with said source of negative pressure, the other with said power cylinder, said valve member being actuated by a needle-valve coupled to said control lever at said second point, the chamber of said negative pressure regulator communicating with the power cylinder having two separate compartments, only a first of said compartments being directly coupled to said power cylinder and adapted to be directly connected to the first chamber of said regulator by the associated valve member, a second compartment which is coaxial to the first compartment, said needle-valve being subjected to the pressure of said second compartment only, said compartments communicating with each other by passage means incorporating pressure drop passage means.

18. An assistance device as claimed in claim 17, in which said needle-valve is provided with an annular skirt on its face opposite to its face bearing the associated valve member, said first compartment being formed inside said skirt and the second compartment outside said skirt.

19. An assistance device as claimed in claim 18, in which said pressure-drop means comprises at least one throttle passage formed in the skirt of said needle-valve.

20. An assistance device as claimed in claim 18, in which the edge of the skirt of said needle-valve bears annularly against a resiliently deformable closure diaphragm.

21. An assistance device as claimed in claim 20, in which said pressure-drop means comprises at least one throttle slot formed on the edge of the skirt of said needle-valve.

22. An assistance device as claimed in claim 20, in which said pressure-drop means comprises at least one channel formed in said resiliently deformable diaphragm.

23. An assistance device as claimed in claim 17, in which the needle-valve of said negative pressure regulator is coupled to said second point on the control lever by a rod system comprising friction coupling means associated with lost motion means having limited movement.

24. An assistance device as claimed in claim 3, in which said source of pressure is a source of negative pressure, said valve means comprising negative pressure regulator having two chambers separated by a valve member, one chamber communicating with the source of negative pressure, and the other with said power cylinder, said valve member being actuated by a needle-valve connected at said second point on the control lever, and the needle-valve of said negative pressure regulator is coupled to said second point on the control lever by a rod system including friction coupling means associated with lost motion means having limited movement.

25. An assistance device as claimed in claim 24, in which said cam support is a movably mounted slide, two abutments being provided, one for said slide, the other for said cam, and said resilient blade bears against said cam.

26. An assistance device as claimed in claim 24, in which said rod system comprises a rod coupled on the one hand to said second point on said control lever and on the other hand to a rotatable cam at an eccentric point on said cam, said friction coupling means being interposed between said cam and a cam support movably mounted under the action of said associated lost motion means, and further comprises resilient means comprising resilient blade coupled to said needle-valve.

27. An assistance device as claimed in claim 26, in which said cam support is a slide movably mounted between two abutments forming said associated lost motion means, said resilient blade bearing against said cam.

28. A device as claimed in claim 26, in which said cam support is a lever pivotally mounted between said two abutments forming said associated lost motion means, and said resilient blade bears against said cam.

29. A device as claimed in claim 26, in which said cam support is a lever pivotally mounted, two abutments forming said associated lost motion means being disposed on each side of said cam and adapted to cooperate therewith, and said resilient blade bears against said lever.

30. An assistance device as claimed in claim 3, in which at least one of said points is laterally offset with respect to said control lever.

31. An assistance device as claimed in claim 3, said assistance means exerting power assistance that varies in magnitude directly as the displacement of said control lever over at least an initial portion of the displacement of said control lever.

\* \* \* \* \*